United States Patent [19]

Lax

[11] Patent Number: 5,085,322

[45] Date of Patent: Feb. 4, 1992

[54] BOTTOM-LOAD VIDEO CASSETTE CONTAINER

[75] Inventor: Michael Lax, Oyster Bay Cove, N.Y.

[73] Assignee: Autronic Plastics, Inc., Westbury, N.Y.

[21] Appl. No.: 572,185

[22] Filed: Aug. 24, 1990

[51] Int. Cl.$^5$ .............................................. B65D 85/672
[52] U.S. Cl. ...................................... 206/387; 206/232; 206/459
[58] Field of Search .................. 206/387, 232, 459, 807

[56] References Cited

U.S. PATENT DOCUMENTS

| | | | |
|---|---|---|---|
| Re. 30,184 | 1/1980 | Ackeret | 206/387 |
| 3,885,670 | 5/1975 | Cousino | 206/387 |
| 3,904,259 | 9/1975 | Hoffmann et al. | 206/387 |
| 3,969,007 | 7/1976 | Lowry | 206/387 |
| 3,994,551 | 11/1976 | Ackeret | 206/387 |
| 4,046,255 | 9/1977 | Ackeret | 206/387 |
| 4,303,159 | 12/1981 | Stone et al. | 206/387 |
| 4,314,637 | 2/1982 | Posso | 206/387 |
| 4,314,643 | 2/1982 | Forbes, Jr. | 206/807 |
| 4,399,913 | 8/1983 | Gelardi et al. | 206/387 |
| 4,406,369 | 9/1983 | Wallace et al. | 206/387 |
| 4,445,634 | 5/1984 | Sato | 206/387 |
| 4,488,644 | 12/1984 | Wynalda | 206/387 |
| 4,501,359 | 2/1985 | Yoshizawa | 206/387 |
| 4,643,301 | 2/1987 | Hehn et al. | 206/387 |
| 4,678,080 | 7/1987 | Nelson | 206/387 |
| 4,717,021 | 1/1988 | Ditzig | 206/387 |
| 4,753,347 | 6/1988 | Bellante et al. | 206/387 |
| 4,838,420 | 6/1989 | Collett | 206/387 |
| 4,921,097 | 5/1990 | Finke et al. | 206/387 |
| 4,947,989 | 8/1990 | Horton | 206/459 |
| 4,987,999 | 1/1991 | Hehn | 206/387 |
| 4,988,000 | 1/1991 | Weisburn et al. | 206/387 |

*Primary Examiner*—Paul T. Sewell
*Assistant Examiner*—M. Denise Patterson
*Attorney, Agent, or Firm*—Lowe, Price, LeBlanc & Becker

[57] ABSTRACT

A video cassette storage container comprises a transparent enclosure having upper, lower and sidewall surfaces, and top and bottom ends, wherein the top end is enclosed and the bottom end is open to receive a video cassette for storage. A tab, pivotably connected to the upper surface of the enclosure, has a perpendicular end portion that partially encloses the bottom end for retaining a video cassette in the enclosure. The tab is pivoted open manually to release the video cassette for removal from the bottom end of the enclosure. A graphics sleeve retaining member formed within the enclosure retains a graphics sleeve at the bottom end, and a door hinged to the upper end of the enclosure is opened manually for receiving the sleeve and cassette.

25 Claims, 5 Drawing Sheets

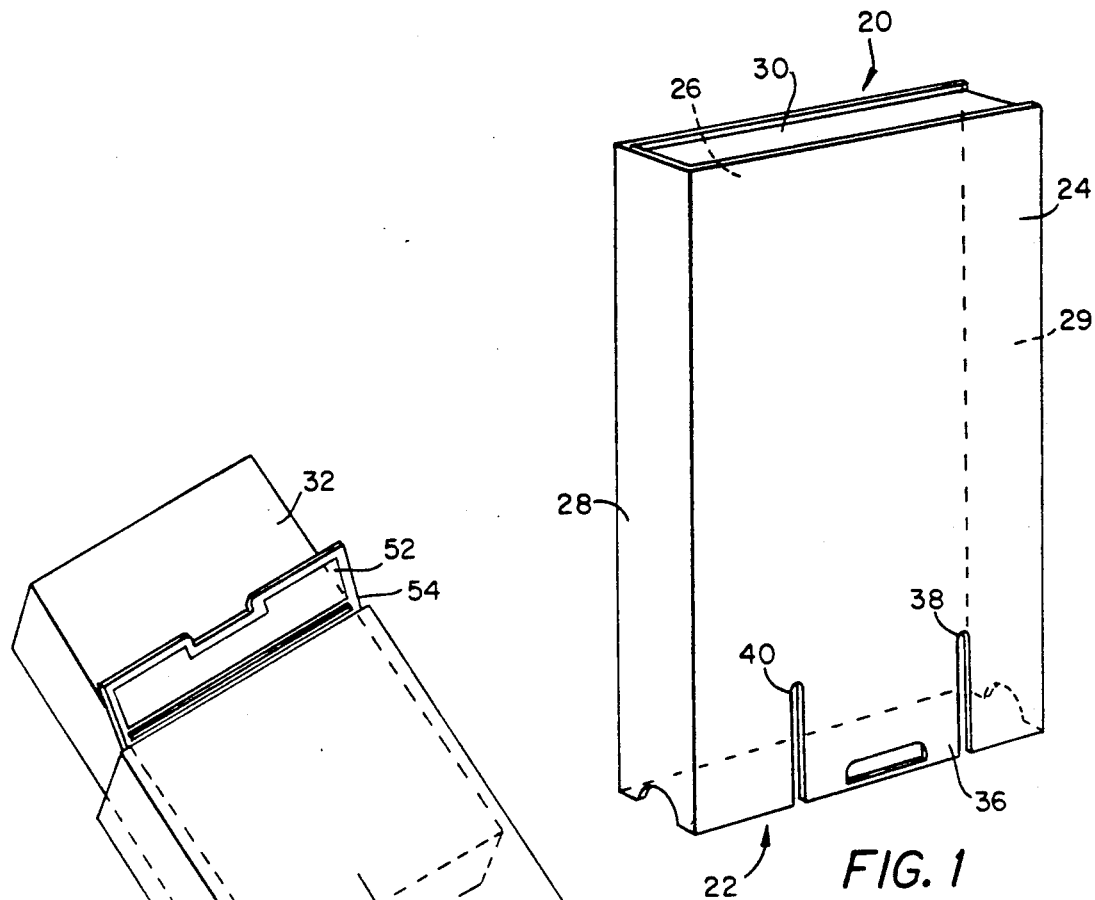
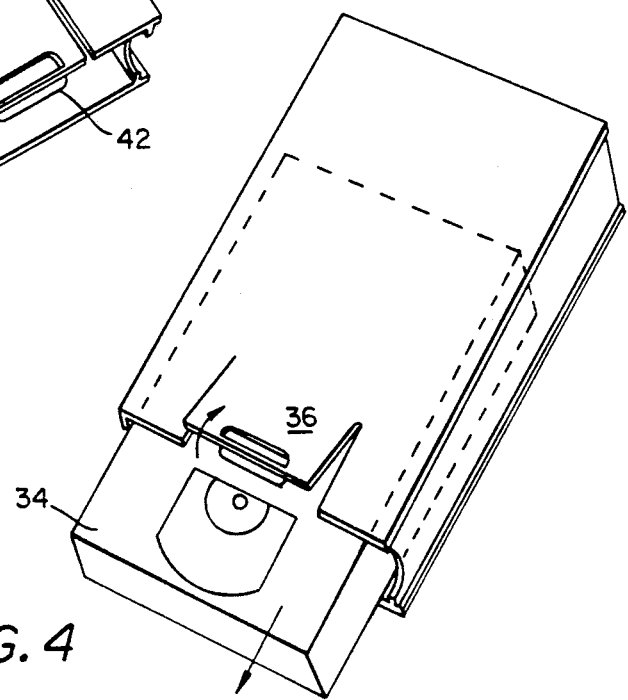
FIG. 1
FIG. 3
FIG. 4

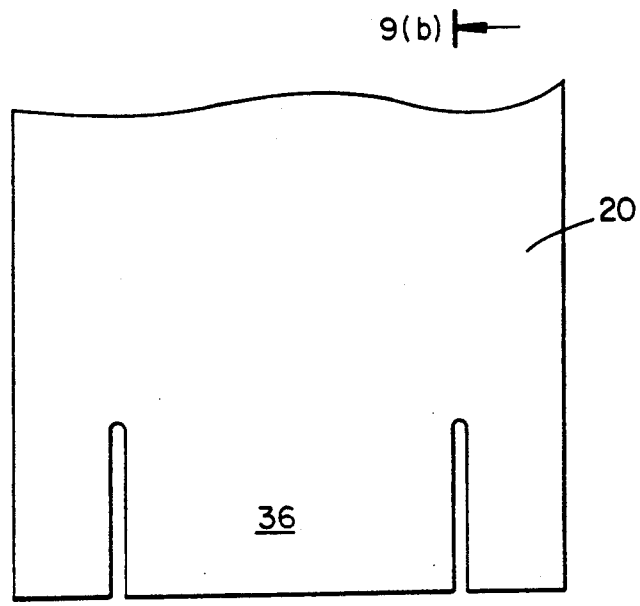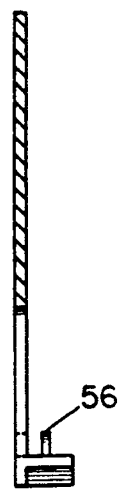
FIG. 9(a)    FIG. 9(b)
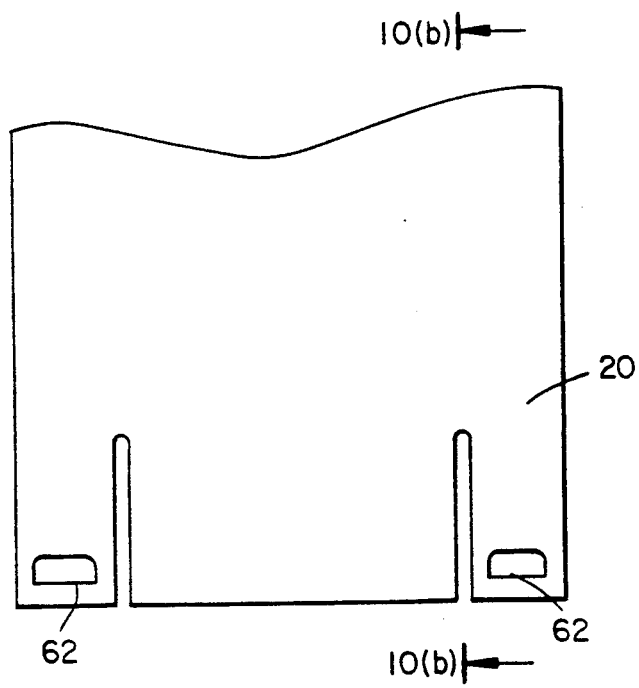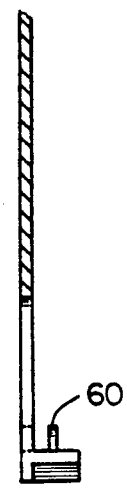
FIG. 10(a)    FIG. 10(b)

BOTTOM-LOAD VIDEO CASSETTE CONTAINER

TECHNICAL FIELD

The invention relates generally to article containers and more particularly to containers enclosing video cassettes, together with graphics sleeves, visible from the outside.

BACKGROUND ART

In the video cassette rental and sales industry, containers for the cassettes, sometimes termed video storage boxes, are stored on shelves available for perusal by customers. The containers each carry a graphics sleeve, visible to the customer, advertising the content of the cassette. The container may or may not also contain the cassette itself; some video rental stores display only the container and graphics sleeve, and store the cassette elsewhere.

Two types of video cassette containers are common in the industry. The first type is a so-called standard VHS cassette storage box having a plastic pouch to hold graphics sleeve. Disadvantageously, the standard storage box requires one side of the graphics sleeve to be cut so that it can be held in the pouch. The second type is a bottom-load video cassette container having one open end to receive or discharge the cassette. Graphics sleeves conventionally are produced to fit within a bottom-load container without modification.

Some types of bottom-load containers (so-called "squeeze-type" containers) retain the cassette inside by a friction fit; the cassette is released by squeezing the sidewalls of the container. Other types use a key to release the cassette or implement an end cover or latch, and still others have no means to retain the cassette at all. The graphics sleeve is loaded into the container, secured in place by tape or retained by small nub-like protrusions.

Video cassette containers of the prior art have several deficiencies. Some containers do not retain cassettes adequately. When the container is returned to the video rental store through a "drop box", the cassette has a tendency to become dislodged from the container. Those containers that retain the cassette by friction fit, a cover or a key are difficult to release manually, particularly by the elderly or arthritic.

Other conventional containers do not retain the graphics sleeve adequately. If the graphics sleeve is not retained in the enclosure by tape or other means, the sleeve will tend to slip from the enclosure as the cassette is removed. On the other hand, when the sleeve is retained by tape or protrusions in the enclosure, the sleeve itself tends to become damaged. The graphics sleeve is particularly difficult to remove from a squeeze-type container without damaging the sleeve. This is a serious problem, as the graphics sleeve must be in good condition when the rental cassette ultimately is sold.

The cassette container furthermore should be constructed so as to enable the graphics sleeve to be clearly visible to customers. That is, the material forming the container must display excellent light transmissivity. To be marketable, the container must be easily mass produced and low in cost.

DISCLOSURE OF THE INVENTION

One object of the invention is to provide a video cassette container that retains a cassette securely while enabling the cassette to be easily removed manually.

Another object of the invention is to display a graphics sleeve in a video cassette container with superior visual clarity.

Another object is to retain the graphics sleeve within a video cassette container without cutting or otherwise altering the sleeve.

Another object is to retain the graphics sleeve of a video cassette within a video container, without exposing the sleeve to damage during insertion or removal of the cassette.

A further object is to enable insertion and removal of a graphics sleeve to and from a cassette container without damaging the sleeve.

Another object of the invention is to provide a video cassette container that tends not to break during repetitive normal use.

Another object is to provide a video cassette container that is capable of being easily and inexpensively mass produced.

The above and other objects of the invention are satisfied by an enclosure having substantially the same shape as, and being slightly larger than, a standard video cassette. The cassette is of a bottom-load type with the top end being enclosed and the bottom end open to receive a video cassette. In accordance with one aspect of the invention, a spring tab on the enclosure retains the video cassette during storage. The spring tab is resiliently connected to the enclosure and is oriented so as to be manually pivotable to release the video cassette for removal.

In accordance with another aspect of the invention, a retaining member formed within the enclosure retains a graphics sleeve at the bottom end. The retaining member preferably has a hook-shaped cross-section supporting the lower edge of the sleeve. The member may be located on the inner surface of the spring tab or on the inner surface of the enclosure outside the tab.

The spring tab preferably is integral with the enclosure, formed by a pair of slits, longitudinal to the enclosure and extending through to the bottom end. A perpendicular extending portion, molded to the lower end of the tab, retains the cassette. The cassette is removed by manually pivoting the spring tab outward until the perpendicular portion swings free of the cassette.

In accordance with another aspect, the top end of the container is enclosed by a door that can be opened to insert the graphics sleeve. The sleeve together with cassette is lowered into the container until the lower edge of the sleeve rests on the retaining member. The enclosure, formed of a transparent material that preferably comprises a styrene-butadiene block copolymer, is transparent to enable the graphics sleeve to be visible clearly from the outside.

The container is formed by a blank of material, folded along two "living hinges" defining one sidewall with the upper surface of the cassette extending from one hinge, and molded with a strip of material forming the opposite sidewall. The upper surface and opposite sidewall of the enclosure are sealed together by ultrasonic welding.

Still other objects and advantages of the present invention will become readily apparent to those skilled in this art from the following detailed description, where only preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1 is a perspective view of a video cassette container in accordance with a preferred embodiment of the invention;

FIG. 3 shows the graphics sleeve (cassette not shown) being inserted into the container through the top end;

FIG. 4 is a perspective view of the container, with spring tab pivoted outward to remove a cassette;

FIGS. 9(a) and 9(b) are top and side-sectional views showing the location of a sleeve retaining member, in accordance with one embodiment of the invention;

FIGS. 10(a) and 10(b) are side-sectional views of the enclosure showing sleeve retaining members positioned in accordance with another embodiment;

BEST MODE FOR CARRYING OUT THE INVENTION

Figure 2:
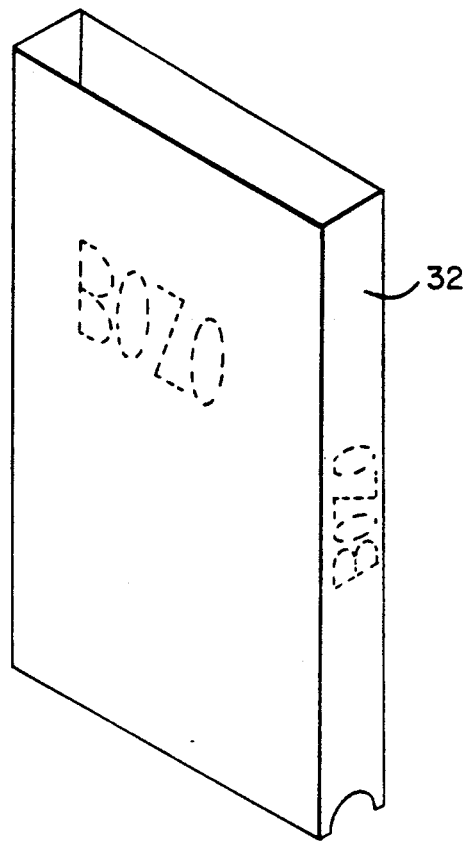
FIG. 2 is a perspective view of an graphics sleeve inserted into the container of FIG. 1.

In FIG. 1, a video cassette container or video storage box, in accordance with the invention, is of a bottom load type, with the bottom end 22 open to receive or discharge a standard video cassette of VHS or other format. The cassette comprises an enclosure 20 characterized by upper and lower panels 24, 26, sidewalls 28 and 29 and a top, enclosed end 30. The container 20 is substantially the same shape as, but is slightly larger than, a standard cassette 34 shown in FIG. 4.

The enclosure 20 is adapted to receive and store a graphics sleeve 32, shown in FIG. 2, that will surround a standard video cassette stored in the container. The graphics sleeve 32 conforms the shape of the enclosure 20, as shown in FIG. 2, and is sized to fit within it.

Figure 11A:
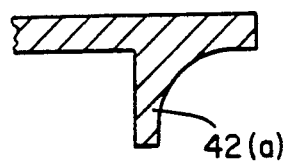
FIGS. 11(a) and 11(b) are side-sectional views of the end portion of the spring tab in accordance with the preferred embodiments.
Figure 11B:
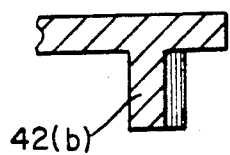

At the bottom end of the enclosure is formed a resilient spring tab 36 to enable cassette 34 to be bottom loaded into the container and retained therein. The spring tab 36, coplanar and integral with the upper panel 24 of the enclosure, is formed by a pair of parallel slits 38, 40 cut into the enclosure and extending to the bottom edge. The lower end of the spring tab 36 has a portion 42 extending into the enclosure, perpendicular to the panel 24, and underlying a video cassette to retain the cassette in the enclosure. The tab portion 42 is shown more clearly in the embodiment of FIGS. 11(a) and 11(b), with tab 42a in FIG. 11(a) having a lower surface that is arcuate to provide reinforcement so that the tab will not crack under loading by a cassette. The arcuate surface, flattened near the outer end of the spring tab, also causes the finger or thumb to slip off before excessive force can be applied to damage the tab. In the embodiment of FIG. 11(b), the lower surface of the tab is reinforced by pairs of ribs designated by 42b.

Spring tab 36 is manually pivoted outward, as shown in FIG. 4, to enable a cassette 34 to be inserted or discharged through the bottom of the enclosure 20. The enclosure 20 accordingly must be made of a flexible, yet resilient, material that is also transparent to enable the graphics sleeve 32 to be visible clearly from the outside. In accordance with the preferred embodiment, the material forming container 20 is a styrene-butadiene block copolymer. Preferably, the block copolymer is formed by essentially equal quantities of K-Resin (TM), manufactured by Phillips 66, of Bartlesville, Okla. and Finaclear 520 (TM), manufactured by Fina Oil and Chemical, of Dallas, Tex. This material exhibits excellent light transmissivity, i.e., on the order of 91%. This is in contrast with video cassette containers of the prior art, formed typically of a clarified polypropalyne, having a transmissivity on the order of 80%.

To minimize stress in the upper surface of the enclosure as spring tab 36 is manually pivoted to provide clearance for a video cassette, the surface of the container at the upper ends of slits 38 and 40 is formed with apertures 41, 44. The apertures 42, 44 tend to prevent overstressing by spreading the force applied to the tab along the inner surfaces of the apertures.

Figure 8A:
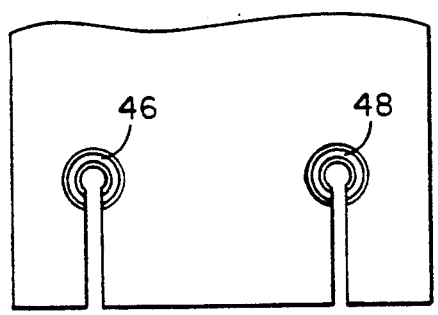
FIGS. 8(a) and 8(b) are top and side views of reinforcement of the spring tab in accordance with another embodiment.
Figure 8B:
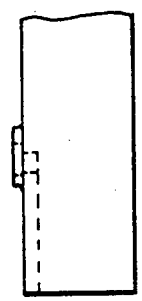
Figure 5:
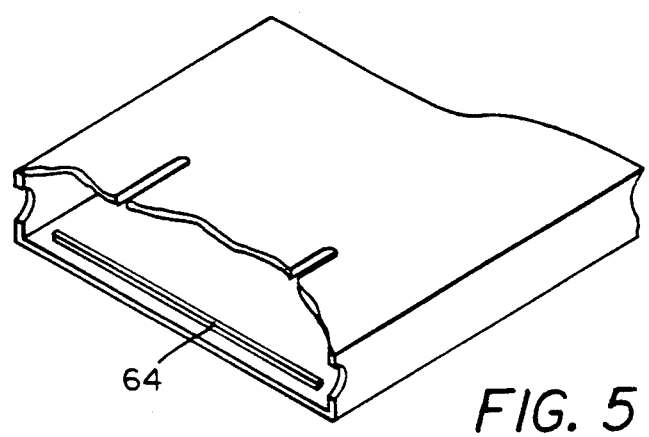
FIG. 5 is a view of the bottom end of the container, with a portion broken away to expose a sleeve retention strip.

In the embodiment of FIGS. 8(a) and 8(b), the apertures are reinforced by grommets 46 and 48 molded with the surface of the container. The grommets 46, 48 are preferably in the form of toroids ("donuts") encircling, but being slightly spaced apart from, the apertures as shown. The upper surface is shown as being slightly flattened although flattening is not necessary. This structure has been carefully engineered to strategically reinforce the spring tab 36. In absence of reinforcement of the tab in this manner, the material forming the tab 36 will tend permanently deform over sustained use, as the material is caused to exceed its elastic modulus.

Figure 6A:
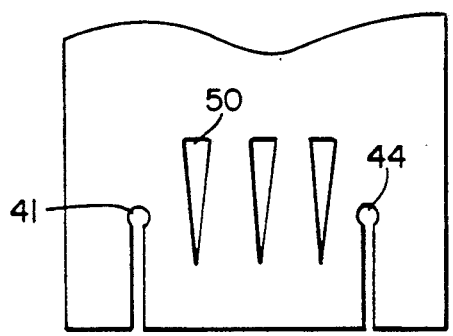
FIGS. 6(a) and 6(b) are partial top views of the container, showing two embodiments of reinforcement ribs applied on the tab.
Figure 6B:
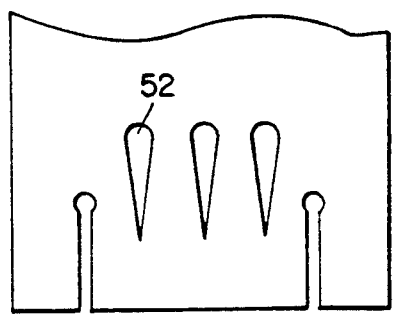
Figure 7A:
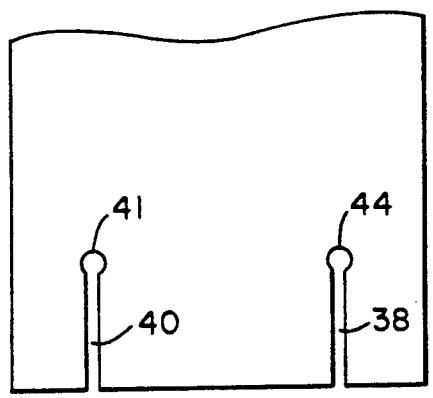
FIGS. 7(a) and 7(b) are partial top and side views of a portion of the enclosure showing reinforcement of the tab in accordance with one embodiment of the invention.
Figure 7B:
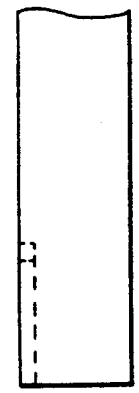

As a further refinement, reinforcement ribs, shown in FIGS. 6(a) and 6(b), are optionally molded in the upper surface of the tab in the region between apertures 41 and 44. The ribs can have either the configuration shown as 50 in FIG. 6(a) or that of elements 52 in FIG. 6(b), although many other configurations are possible. What is important is that the ribs 50, 52 intersect the region between the apertures 41 and 44 so as to prevent a fold line from forming.

With reference to FIG. 3, the graphics sleeve 32, together with cassette (not shown), is inserted into the container 20 from the top end. This is made possible by a door 52 pivotally attached to the container at a hinge 54. The hinge 54 preferably is formed integrally with the surface of the container as a conventional "living hinge". The door 52, when closed, is retained in the closed position by protrusions 53 (FIG. 12) formed on the inner surface of the container. The side of the door 52 at ear 55 also interlocks with a recess 58 formed in at least one of the sidewalls, as shown. The protrusions 56 and ear 55 are necessary to prevent the door from inadvertently opening when the container is dropped. This commonly occurs when video cassettes are returned to a video rental store through a drop-box.

The sleeve 32, having been inserted into the enclosure through the top end 30, is retained at least by one sleeve retaining member formed on the inner surface of the enclosure. One example is member 58, shown in FIGS. 9(a) and 9(b), formed on the inner surface of tab 36. In the embodiment of FIGS. 10(a) and 10(b), sleeve retaining members 60 are formed on the inner surface of the container, outside tab 36 and behind openings 62. In either case, the tabs 58, 60, being hook-shaped in cross-section, securely retain the lower edge of the graphics sleeve. The sleeve is prevented from slipping from the bottom of the container when tab 36 is opened to release a cassette. The hook-shaped members 58, 60 are also advantageous because no damage is imparted by them to the edge of the graphics sleeve, improving the marketability of the cassette.

The lower edge of the graphics sleeve is stabilized in the container by a retention strip 64, formed on the inner surface of the container, opposite the tab 36. This strip prevents a portion of the graphics sleeve opposite the tab 36 from slipping beneath the bottom end of the cassette. Additional protrusions 53 formed on the inner surface of the door help retain the sleeve and cassette in position within the enclosure when the door is closed.

Figure 12:
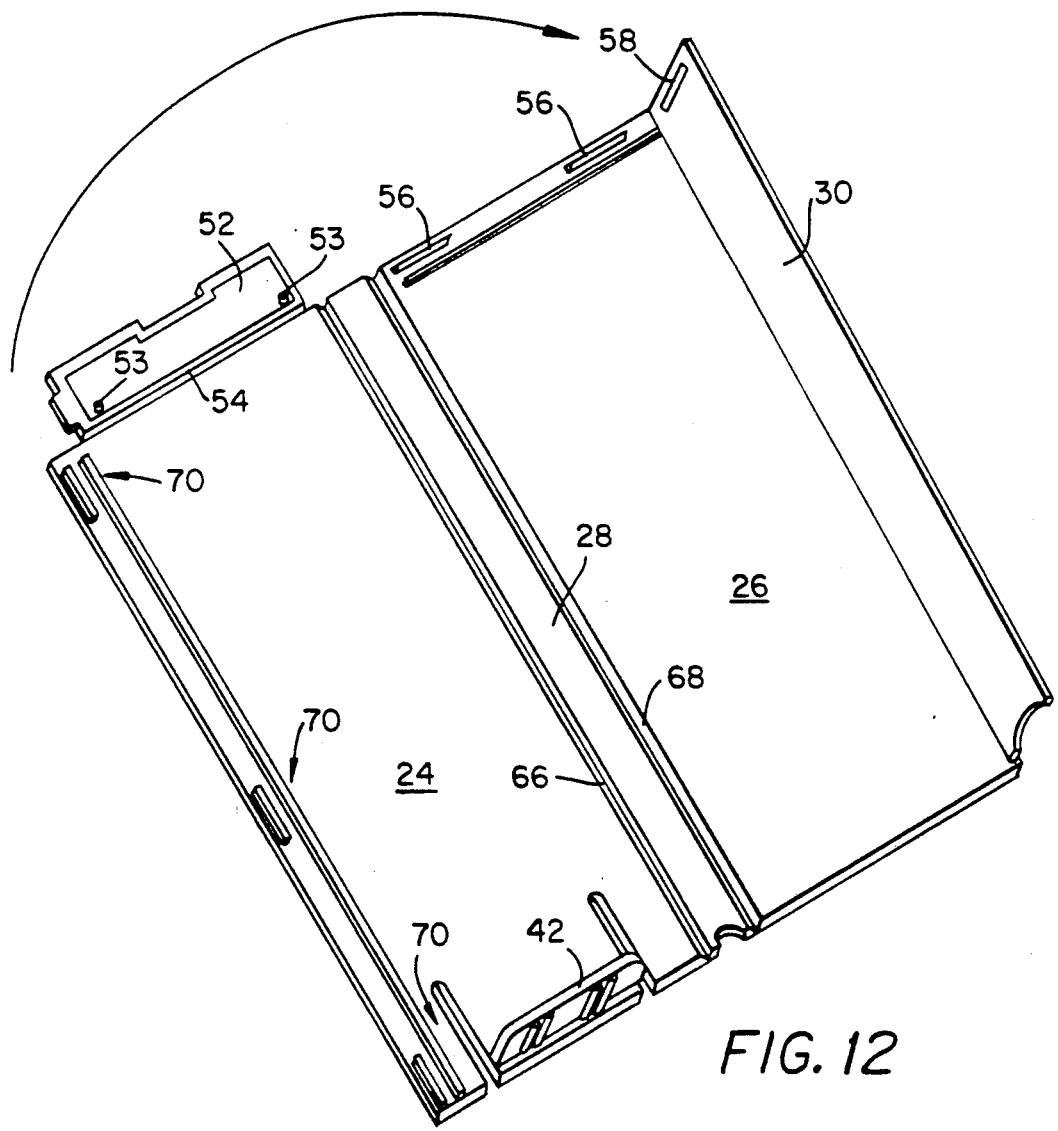
FIG. 12 is a perspective view of a blank of material used to form the container.

With reference to FIG. 12, the cassette is manufactured from a blank of material, with upstanding sidewall 29 and tab portion 42 molded on in the positions shown. The opposite sidewall 28 is defined by score lines 66, 68 forming "living hinges". A third living hinge 54 is formed between the door 52 and the container. The container is assembled by folding panel 24 and panel 26 on the hinges 66, 68 until the edge of panel 24 is overlying sidewall 29. With the upper edge of the sidewall 29 beneath and retained in guides 70 on panel 24, the surfaces are sealed together by ultrasonic welding.

Accordingly, a video cassette container is provided by this invention that is easily and economically manufactured. It is bottom-loaded, with a cassette retained by a tab integrally formed with the container and pivotable manually to release. An graphics sleeve together with cassette is top loaded to the container through a door, and is retained by members formed on the inner surface of the container, near the bottom end. The container, being made of a styrene-butadiene block copolymer and having the particular constituents described in the preferred embodiment, results in excellent optical transparency, good flexibility and excellent resistance to breakage.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. A video cassette storage container, comprising:
   an enclosure having substantially the same shape as, and being slightly larger than, a video cassette;
   said enclosure having upper, lower and sidewall surfaces, and top and bottom ends, wherein the top end is enclosed and the bottom is open to receive a video cassette for storage;
   a pair of slits in said upper surface or said lower surface extending to said bottom end to form an integral spring tab resiliently connected to said enclosure and oriented so as to be manually pivotable to release said video cassette for removal from said enclosure, said spring tab being formed integrally with and extending from the upper surface or the lower surface to partially enclose the bottom end of said enclosure to contact and retain a video cassette stored therein;
   a pair of apertures in said upper surface or said lower surface, wherein each of said apertures is formed at a corresponding end of one of said pair of slits to relieve stress during manual pivoting of said spring tab; and
   grommets formed around said apertures.

2. The video cassette storage container of claim 1, wherein a graphics sleeve retaining member is formed on an inner surface of said tab.

3. The video cassette storage container of claim 1, wherein a graphics sleeve retaining member is formed on an inner surface of said enclosure outside said tab.

4. The video cassette storage container of claim 1, wherein a surface of said tab contains reinforcing ribs.

5. The video cassette storage container of claim 1, wherein said tab comprises a first portion coplanar with said upper or lower surface of said enclosure and a second portion perpendicular therewith.

6. The video cassette storage container of claim 5, including reinforcing ribs formed on said second portion of said tab.

7. The video cassette storage container of claim 1, wherein said enclosure is formed of a blank of a plastic material having first and second longitudinally extending fold regions defining one sidewall of said enclosure, wherein the upper surface of said sidewall extends from one of said fold lines, a molded member perpendicular to said blank forming the other sidewall, and wherein said other sidewall is joined to said upper surface of said enclosure by ultrasonic welding.

8. The video cassette storage container of claim 7, wherein said top end is formed by a door hinged to said enclosure by a "living hinge".

9. The video cassette storage container of claim 8, wherein said fold lines are formed by "living hinges."

10. The video cassette storage container of claim 9, wherein said enclosure is formed of a styrene-butadiene block copolymer.

11. A video cassette storage container of claim 5, wherein a lower surface of said perpendicular portion is arcuate.

12. A video cassette storage container of claim 1, wherein said grommets comprise toroids formed on said enclosure, encircling, but spaced slightly apart from, said apertures.

13. The video cassette storage container of claim 1, further comprising:
    a graphics sleeve retaining member formed within said enclosure for retaining a graphics sleeve therein at said bottom end; and
    a door hinged to said enclosure at said top end, openable for receiving or discharging said graphics sleeve.

14. A video cassette storage container, comprising:
    an enclosure having substantially the same shape as, and being slightly larger than, a video cassette;

said enclosure four wall surfaces, and top and bottom ends, wherein said top end is enclosed and said bottom end is open to receive a video cassette for storage;

a pair of slits in one of said wall surfaces extending to said bottom end to form an integral spring tab resiliently connected to said enclosure and oriented so as to be manually pivotable to release said video cassette for removal from said enclosure, said spring tab being formed integrally with and extending from the one wall surface to partially enclose the bottom end of said enclosure to contact and retain a video cassette stored therein; and a graphics sleeve retaining member formed within said enclosure at a bottom end of the one wall surface between one of the slits and an adjacent one of the wall surfaces, for retaining a graphics sleeve therein.

15. The video cassette storage container of claim 14, wherein the top end of said enclosure is pivotable between an open position to enable insertion of a graphics sleeve and a closed position to retain said sleeve within said enclosure.

16. The video cassette storage container of claim 15, wherein said top end is formed by a door hinged to said enclosure.

17. The video cassette storage container of claim 16, wherein said door is hinged to said enclosure by a "living hinge".

18. The video cassette storage container of claim 16, including projections formed on one of the wall surfaces of said enclosure for retaining said door in the closed position.

19. The video cassette storage container of claim 16, further including a recess in at least one of the wall surfaces of said enclosure, receiving an end portion of said door for retaining said door in the closed position.

20. The video cassette storage container of claim 14, wherein said enclosure is transparent.

21. The video cassette storage container of claim 16, wherein a notch is formed along an edge of said door for access.

22. The video cassette storage container of claim 14, wherein said retaining member is hook-shaped in cross-section to retain the lower edge of a graphics sleeve.

23. A video cassette storage container of claim 16, wherein an inner surface of said tab is formed with protrusion to contact, when closed, a sleeve and cassette stored in said enclosure.

24. The video cassette storage container of claim 14, wherein said material comprises a styrene-butadiene block copolymer.

25. The video cassette storage container of claim 24, wherein said block copolymer consists essentially of equal quantities of Finaclear 520 (TM) and K-Resin (TM).

* * * * *